2,754,303
PROCESS OF PRODUCING NORMAL ZINC MERCAPTOBENZOTHIAZOLE

Marion W. Harman, Nitro, W. Va., assignor to Monsanto Chemical Company, St. Louis, Mo., a corporation of Delaware No Drawing. Application April 7, 1954, Serial No. 421,699

2 Claims. (Cl. 260—299)

The present invention relates to a method of making the normal zinc salt of mercaptobenzothiazole.

The usual method of preparing the so-called zinc salt of mercaptobenzothiazole is to react a soluble zinc salt with an aqueous alkaline solution of mercaptobenzothiazole, the zinc salt precipitating by double decomposition. However, the product which precipitates is not the normal salt but generally contains about 20% by weight free mercaptobenzothiazole. The mercaptobenzothiazole can be determined by extraction with acetone in which both the normal and basic zinc salts are insoluble or determined volumetrically. For the latter a 0.6 gram sample in 100 cc. of 95% alcohol is titrated with 0.1 N sodium hydroxide to phenolphthalein end point. Apparently the course of the reaction is represented by the following equation:

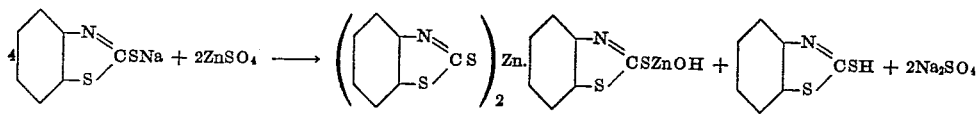

Thus the analysis fits the postulation that there is produced one molecule of a double salt made up on one molecule of the normal salt and one of the basic salt together with one molecule of free mercaptobenzothiazole. Attempts to obtain the normal salt by using a large excess of the precipitating ion or by hot precipitation were totally unsuccessful.

However, it was found that the normal zinc salt of mercaptobenzothiazole readily forms by heating the product precipitated from an aqueous solution of the mercaptobenzothiazole by a soluble zinc salt. Alternatively, the basic zinc salt is converted to the normal salt by heating with free mercaptobenzothiazole. The basic salt is formed in good yield by precipitating in the presence of caustic soda. For example, addition of one mole of zinc sulfate to a solution containing one mole of sodium mercaptobenzothiazole and one mole of sodium hydroxide gives a good yield of the basic salt.

The conversion to the normal salt is effected in a short time by heating at 200° C. or above. Heating 2–3 hours at this temperature is sufficient to reduce the mercaptobenzothiazole to about 3%. While conversion can be effected at lower temperatures, the reaction time may become so long as to be uneconomical.

Example

Into a 2-liter, 3-necked flask provided with a stirrer was charged 630 grams of an aqueous solution of 0.5 mole of sodium mercaptobenzothiazole. This solution was stirred while a solution of 50 grams of 89% zinc sulfate in 450 grams of water was run in gradually. Stirring was continued for about an hour at which time the mixture was acid to litmus. The solids were separated by filtration, washed with water and dried at 70° C. There was obtained 95 grams of a pale yellow finely divided solid. Analysis gave 19.9% mercaptobenzothiazole. The value calculated for

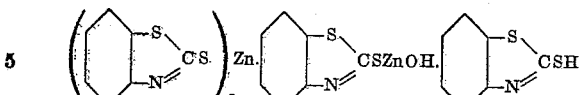

was 20.5%. After heating this product for 5 hours at 200° C. the mercaptobenzothiazole content found by analysis of two samples was 2.98% and 2.46%. After heating 24 hours at 210–220° C., the mercaptobenzothiazole content was 2.66%. The reaction becomes quite slow after the free mercaptobenzothiazole has been reduced to about 3% so that long heating times may be required to effect further noticeable change. The relationship of time and temperature to mercaptobenzothiazole is further illustrated in the table below:

| Temp., °C. | Percent Free Mercaptobenzothiazole After Heating — | | | | | | | | | |
|---|---|---|---|---|---|---|---|---|---|---|
| | ½ hr. | 1 hr. | 2 hrs. | 3 hrs. | 6 hrs. | 12 hrs. | 24 hrs. | 72 hrs. | 92 hrs. | 230 hrs. |
| 200 | 9.66 | 7.2 | 3.2 | 3.0 | | | | | | |
| 160 | | | | | | | | 8.7 | | |
| 125 | | | | | 17.3 | 16.2 | 10 | 8.7 | 3.2 | |
| 100 | | | | | | | | | | 17.0 |

One of the uses for zinc mercaptobenzothiazole is to accelerate the vulcanization of rubber and for this purpose the normal salt affords a considerable increase in processing safety. The influence of mercaptobenzothiazole in promoting prevulcanization is strikingly illustrated by comparing the effect in a rubber stock of the normal salt (2.6% mercaptobenzothiazole), a partially reacted product (10% mercaptobenzothiazole after heating 24 hours at 125° C.) and a commercial sample of zinc mercaptobenzothiazole (contains approximately 20% mercaptobenzothiazole). Stocks were compounded comprising

| | Parts by weight |
|---|---|
| Smoked sheets | 100. |
| Zinc oxide | 10. |
| Sulfur | 3.0 |
| Stearic acid | 0.5 |
| Diphenyl guanidine | 0.15 |
| Zinc mercaptobenzothiazole | 0.6 |

The resistance to prevulcanization was evaluated by determining plasticity after heating. The plasticity figures were determined by means of a Williams Plastometer described by Williams, Industrial and Engineering Chemistry, vol. 16, p. 362 (1924); see also Krall ibid, vol. 16, p. 922 (1924). The plasticity figure is in reality the height of a rubber test cylinder in 1/100 millimeters after the upper movable plate of the plastometer press has rested on it for a period of three minutes. Lower figures indicates a less curing of the stock. The results are set forth below:

| Accelerator | Plasticity Heating at 1 hour | Readings After 200° F. for 2 hours |
|---|---|---|
| Commercial Zinc Mercaptobenzothiazole | 525 | 770 |
| Product heated 24 hours at 210–200° C | 345 | 722 |
| Product heated 24 hours at 125° C | 517 | 795 |

What is claimed is:

1. The process of making the normal zinc salt of mercaptobenzothiazole which comprises heating at about 200° C. for at least two hours the composite product precipitated from an aqueous solution of mercaptobenzothiazole by a soluble zinc salt in the absence of a diluent reactive with zinc mercaptobenzothiazole.

2. The process of making the normal zinc salt of mercaptobenzothiazole which comprises heating at about 200° C. for at least two hours the basic zinc salt with mercaptobenzothiazole in the absence of a diluent reactive with zinc mercaptobenzothiazole.

References Cited in the file of this patent

UNITED STATES PATENTS

| 2,129,621 | Lichty | Sept. 6, 1938 |
| 2,170,670 | Williams | Aug. 22, 1939 |
| 2,356,932 | Jones et al. | Aug. 29, 1944 |

OTHER REFERENCES

Spacu et al.: J. f. prakt. Chem., vol. 144, pp. 106–114 (1935).

Katz: Proc. Am. Soc. Testing Materials, vol. 48, pp. 1293–5 (1948).

Shobayashi: Chem. Abst., vol. 45, p. 3181 (1951).